United States Patent [19]

Lerner et al.

[11] 4,007,755
[45] Feb. 15, 1977

[54] COMPONENT INJECTION SYSTEM

[75] Inventors: Julius Lerner, Broomall; Robert Mayer, Ardmore, both of Pa.

[73] Assignee: Sun Oil Company of Pennsylvania, Philadelphia, Pa.

[22] Filed: Mar. 6, 1975

[21] Appl. No.: 556,026

Related U.S. Application Data

[63] Continuation-in-part of Ser. No. 434,535, Jan. 18, 1974, abandoned.

[52] U.S. Cl. .............................. 137/101.21; 48/195; 137/101.31; 137/551; 137/563; 137/565
[51] Int. Cl.² .................................. G05D 11/13
[58] Field of Search ............... 48/195; 137/3, 9, 88, 137/101.21, 101.31, 551, 563, 565, 624.13; 222/57

[56] References Cited

UNITED STATES PATENTS

| | | | |
|---|---|---|---|
| 2,527,136 | 10/1950 | Kagi et al. ................... | 137/101.21 |
| 3,070,111 | 12/1962 | Owens .......................... | 137/101.21 |
| 3,216,434 | 11/1965 | Lovendahl ..................... | 48/195 UX |
| 3,235,348 | 2/1966 | Witcher ......................... | 48/195 |
| 3,342,199 | 9/1967 | McEvoy ......................... | 137/88 |
| 3,634,053 | 1/1972 | Klass et al. .................... | 48/195 |
| 3,711,689 | 1/1974 | Park ............................. | 137/551 X |
| 3,751,644 | 8/1973 | Mayer ........................... | 137/88 |
| 3,770,198 | 11/1973 | Mihara .......................... | 137/100 X |
| 3,860,030 | 1/1975 | Mayer ........................... | 137/88 X |
| 3,870,076 | 3/1975 | Graznak ........................ | 137/3 X |
| 3,913,606 | 10/1975 | Anderson ...................... | 137/563 X |
| 3,924,651 | 12/1975 | Hippel et al. .................. | 137/563 X |

*Primary Examiner*—Alan Cohan
*Assistant Examiner*—Gerald A. Michalsky
*Attorney, Agent, or Firm*—J. Edward Hess; Donald R. Johnson; William C. Roch

[57] ABSTRACT

A system for injecting a predetermined amount of additive fluid into a main stream of fluid which controls the amount of additive injected by a timing circuit. A pump continuously circulates the additive through a circuitous path having a valve which diverts the additive into the main stream. A control system receives signals from a turbine meter in the main stream and opens the valve a predetermined length of time at a frequency depending on the signals received from the turbine meter, thereby maintaining a constant concentration of the additive in the main stream.

12 Claims, 8 Drawing Figures

COMPONENT INJECTION SYSTEM

CROSS REFERENCE TO RELATED APPLICATIONS

The invention disclosed and claimed herein is related to the patent application entitled "Pulse Flow Detector" filed on Jan. 18, 1974, Ser. No. 434,534, now U.S. Pat. No. 3,933,039, and is a continuation in part of the patent application entitled "Pulsed Injection System" filed on Jan. 18, 1974, Ser. No. 434,535, now abandoned.

BACKGROUND OF THE INVENTION

This invention is related to a system which controls the amount of an additive being injected into a main stream of fluid and more particularly to a system which regulates the additive injection by timing circuits.

The preparation of fluid chemical products often requires that a fluid additive necessary to the final product be injected into a main stream of another fluid. In the petroleum fuel industry, fluid injection is required in a number of areas. One example is the addition of odorants, such as mercaptans, to odorless gases, such as liquid propane, to warn users of dangerous gas leaks. Another is the addition of anti-oxidants and dyes to gasoline.

In most cases, it is necessary to precisely control the proportion of additive volume to main stream volume for two reasons. First, the additive fluids are usually expensive and must be carefully conserved. Second, a specified minimum amount of an additive must be added to perform the desired function. In the case of liquid propane, for example, Federal safety regulations presently require a minimum of 217 cc. of mercaptans per 100 barrels of propane.

One method of measurement is the loss-in-weight principle exemplified by U.S. Pat. No. 3,452,774 by Stanton. Stanton discloses a flow control system that uses a conventional process controller having normal proportional and integral functions to compare the loss in weight of a tank holding the fluid being injected. The loss-in-weight method is particularly useful where highly viscous fluids are being measured.

A second method of metering an additive fluid is the quantum-volume principle which uses a freely movable piston that is driven back and forth within a liquid-filled cylinder by hydraulic pressure provided by the metered liquid itself. Each piston stroke provides an amount of liquid equal to the volume of the piston stroke.

Many fluids must be carefully confined within the handling and injection systems due to their polluting effects. Low viscosity liquids, such as the anti-oxidants and dyes, that are used in the preparation of gasoline and the odorant liquids, such as mercaptans, that are used to odorize fuel gases that are difficult to confine. The systems that use reciprocating pumps as in Stanton and those that use free-piston metering devices contain rotary and reciprocating shafts that require seals to insulate the liquid chamber from the atmosphere. Although leakage is usually not large, even a small leakage of odorants or dyes is objectionable. In addition, the seals are subject to wear, which causes further leakage, and must be frequently replaced.

SUMMARY OF THE INVENTION

In accordance with a preferred embodiment a system is disclosed which overcomes the problems of the prior art and meets the described needs for a fluid injection system by providing a pump connected to a circuitous transmission path through which the pump circulates a fluid. A valve connects the circuitous path to a main stream line. A flow meter in the main stream produces a series of pulses that indicate the flow rate of the main stream. A timing control circuit opens the valve for a predetermined length of time at a rate dependent upon the main stream flow rate and the injection fluid concentration desired.

An alternative embodiment is disclosed which delays the actuation of the valve until the beginning of a compression stroke of the pump.

In another aspect of the invention, the injection system is sealed from the atmosphere. In addition to an enclosed transmission path, the pump is of the type whose impelling mechanism is separated from its power source by a flexible diaphragm.

In another aspect the invention includes a pulse flow detector between the valve and the main stream to provide a warning if fluid should fail to enter the main stream from the circuitous transmission path and to provide a total of the amount of fluid injected into the main stream.

In another aspect the invention includes an alarm system that compares pulse information from the pulse flow detector with that from the first pulse generator to indicate flow failure in the system.

The invention and its advantages may be more fully understood by referring to the following figures and description of the preferred embodiments.

DESCRIPTION OF THE DRAWING AND PREFERRED EMBODIMENTS

Figure 1:
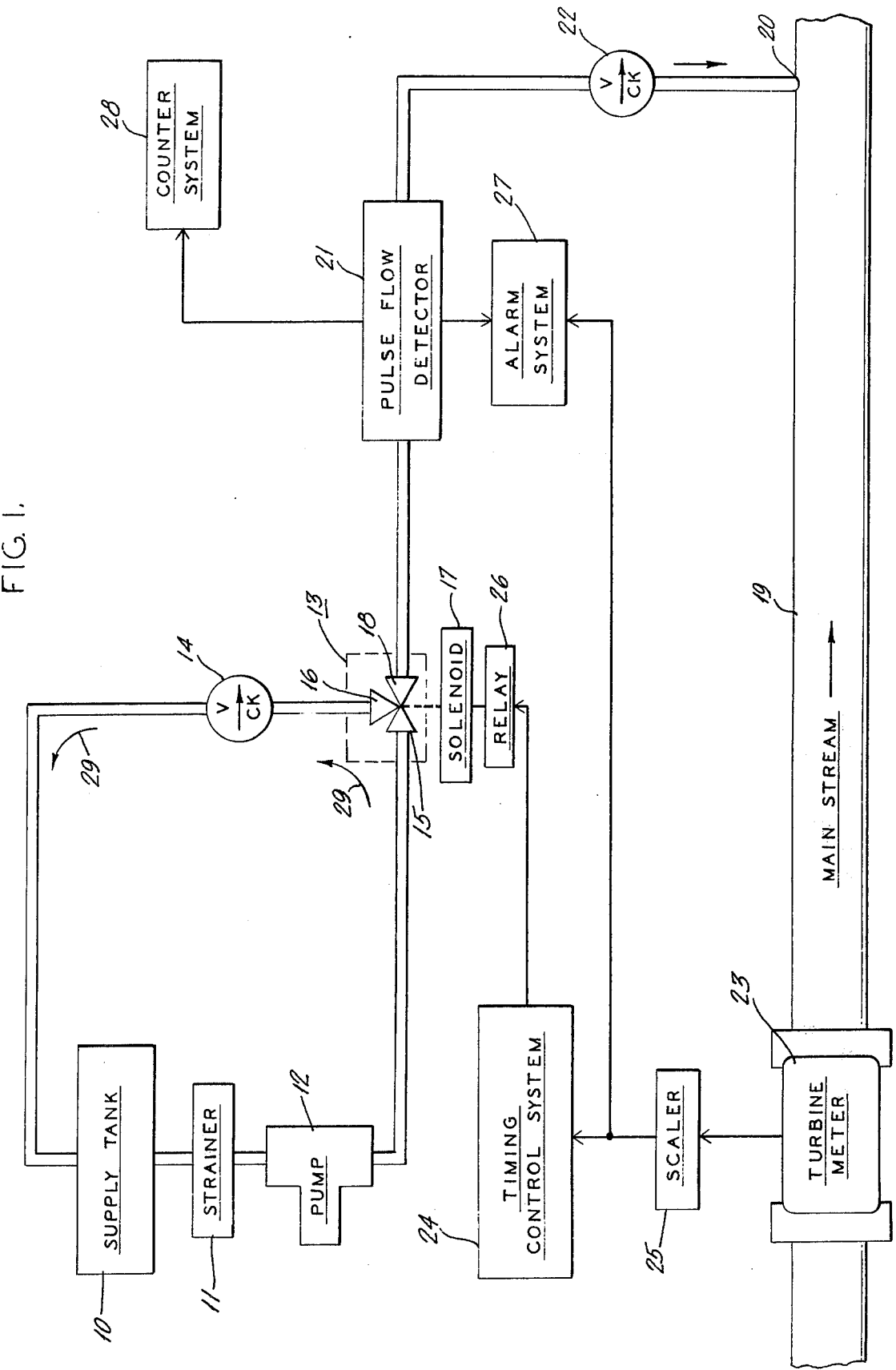
FIG. 1 is a schematic diagram of a preferred embodiment of a fluid injection system.

In FIG. 1, the additive fluid flow path comprises a circuitous flow loop and an injection flow path. An additive supply tank 10, a strainer 11, a pump 12, a three-way diverting valve 13, and a back pressure valve 14 all are connected in series to form the circuitous loop. The pump 12 may be of the reciprocating, positive displacement type having a diaphragm head. The diaphragm seals the pump's impelling mechanism from its motive mechanism, thereby sealing the fluid from the atmosphere. Back pressure valve 14 may be a check valve or other similar type as appropriate. Valve 13 is connected in the loop through two of its ports, continually open port 15 and normally open port 16, and actuated by a solenoid 17.

The injection flow path is connected to the circuitous loop through normally closed port 18 of valve 13 at one end and to the main stream pipe 19 at the injection point 20. Included in the injection flow path are a pulse flow detector 21 and a back pressure valve 22. Any suitable pulse detector may be used, but the pulse detector disclosed in the pending application entitled "Pulse Flow Detector", Ser. No. 434,534, now U.S. Pat. No. 3,933,039, is particularly suitable.

Means for measuring the flow rate, for example a turbine meter 23, is located in the main stream pipeline 19, preferably upstream from injection point 20. Timing control system 24 controls the entire additive injection operation by receiving signals from the turbine meter scaler 25 and actuating valve 13 by activating relay 26 and solenoid 17 at the appropriate times. Also included in the injection system are an alarm system 27 and a counter system 28, which will be described in more detail below.

In the non-injection mode of operation, pump 12 is pumping continuously and valve 13 remains in its normal position which allows the additive to flow through ports 15 and 16, in the direction indicated by arrows 29, through back pressure valve 14, and into supply tank 10. A reserve of the additive is maintained in supply tank 10. Release of the additive into the injection path is achieved by actuating valve 13, which causes the additive to flow through ports 15 and 18 of valve 13.

The timing control system 24 provides a means for controlling the activation of valve 13. Meter 23 emits pulse signals the rate of which is proportional to the flow rate currently being experienced in the main stream pipeline 19. These pulse signals pass through scaler 25 and into timing control system 24, which actuates valve 13. Control system 24 maintains valve 13 in its actuated position for a period of time equal to one cycle of pump 12, or a multiple of cycles, for each signal received from scaler 25.

An alarm system 27 can also be included in this injection system to assure that the proper amount of additive is being injected. This alarm system compares the main stream flow rate indicated by meter 23 and the additive flow rate indicated by pulse flow detector 21. An alarm is sounded if the proper amount of additive is not being injected. Alternatively it may cause the system to automatically cease operation. The alarm circuit 34 may comprise an up-down counter that records the excess of pulses from detector 21 over pulses from scaler 25, and vice versa. For example, a pulse from scaler 25 will cause the counter to increment by one count, and a subsequent pulse from detector 21 will cause the counter to decrement by one count. If the flow fails in either the main stream or the injection stream, the counter will begin to increment, or decrement, and approach a count that will activate alarm 35. The count is chosen sufficiently high, ten for example, such that spurious interruption of fluid flow will not activate the alarm. The above systems will now be described in more detail.

Figure 2:
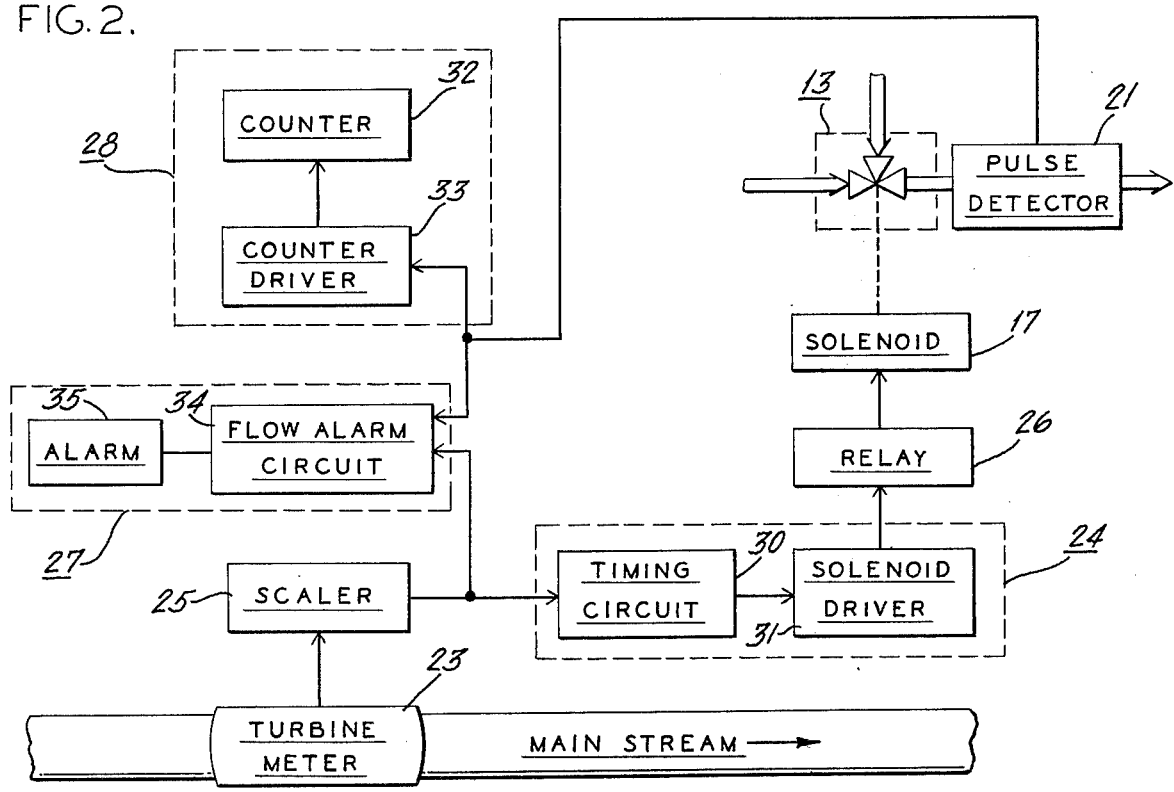
FIG. 2 is a detailed block diagram of the systems employed in the preferred embodiment.

The block diagram in FIG. 2 shows the individual systems and how they are connected. The timing control system 24 includes a timing circuit 30 and a solenoid driver 31. The turbine meter 23 generates signals which are received by scaler 25 where the signals are properly scaled for timing circuit 30. The speed at which pump 12 is pumping is known, therefore, timing circuit 30 and scaler 25 can be manually preset to achieve the desired concentration. Solenoid driver 31 amplifies the signal sent to relay 26 from timing circuit 30. The counter system 28, comprising a counter 32 and a counter driver 33, is connected to the pulse detector 21 merely to keep a record of the number of pulses of additive detected, thereby enabling the total amount of additive injected into the main stream to be determined. The alarm system 27, comprising an alarm circuit 34 and an alarm 35, is connected to pulse detector 21 and turbine meter scaler 25. The alarm circuit 34 compares the two signals received and sounds alarm 35 if the proper proportion of signals is not received.

Figure 3:
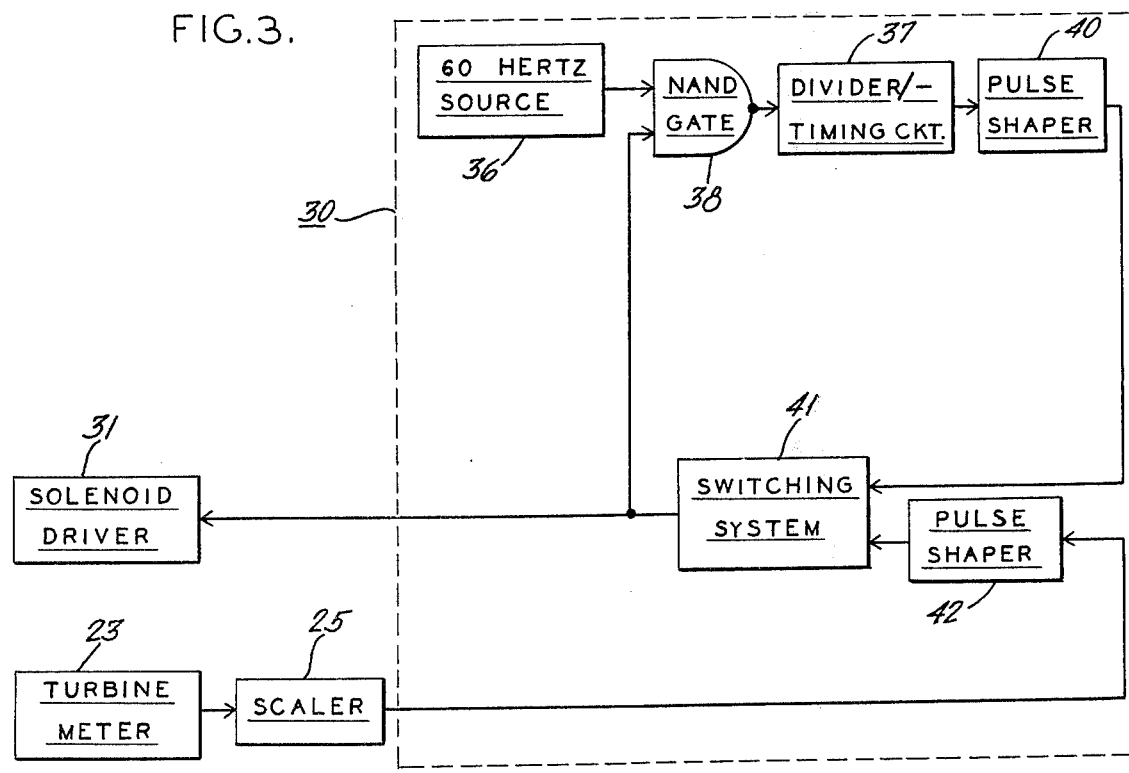
FIG. 3 is a block diagram of the timing control system in FIG. 1.

FIG. 3 shows in more detail the individual electronic systems that together can be used to perform the functions of timing circuit 30. A 60 hertz signal source 36 is connected to a divider/timing circuit 37 through a NAND gate 38. 60 Hertz source 36 serves merely as a reference scale for the divider/timing circuit 37. Included in the divider/timing circuit 37 is a four decade divider arrangement which can be preset to achieve the proper time length for which solenoid 17 should be activated. The output signal from divider/timer 37 passes through a pulse shaper 40 and then enters a switching system 41. The signals from the turbine meter scaler 25 also pass through a pulse shaper 42 and enter a second input terminal of the switching system 41. The output of switching system 41 is connected to both the solenoid driver 31 and a second input terminal of NAND gate 38. The switching system 41 comprises a "set-reset" system connected to act as a "flip-flop" circuit.

In a typical operation of the injection system the pump is set at a given number of cycles per minute, for example 60 cycles per minute. The divider/timing circuit 37 is set for the length of one cycle or a multiple of a cycles, for example one second. The turbine meter scaler 25 is set according to the concentration of additive desired, for example one output pulse for each 10 input pulses. The greater the concentration, the larger the scaler output to input ratio becomes. For each 10 signals produced by turbine meter 23, scaler 25 will produce one scaled signal. This scaled signal sets switching system 41, which causes solenoid driver 31 to activate relay 26 and solenoid 17. This signal also opens NAND gate 38. Since the divider/timing circuit 37 is preset at one second, the signal entering this circuit will be delayed one second before an output signal flows to and resets switching system 41, causing solenoid driver 31 to deactivate relay 26. In this manner, each time a signal is produced by scaler 25, solenoid 17 is activated for one second.

Figure 4:
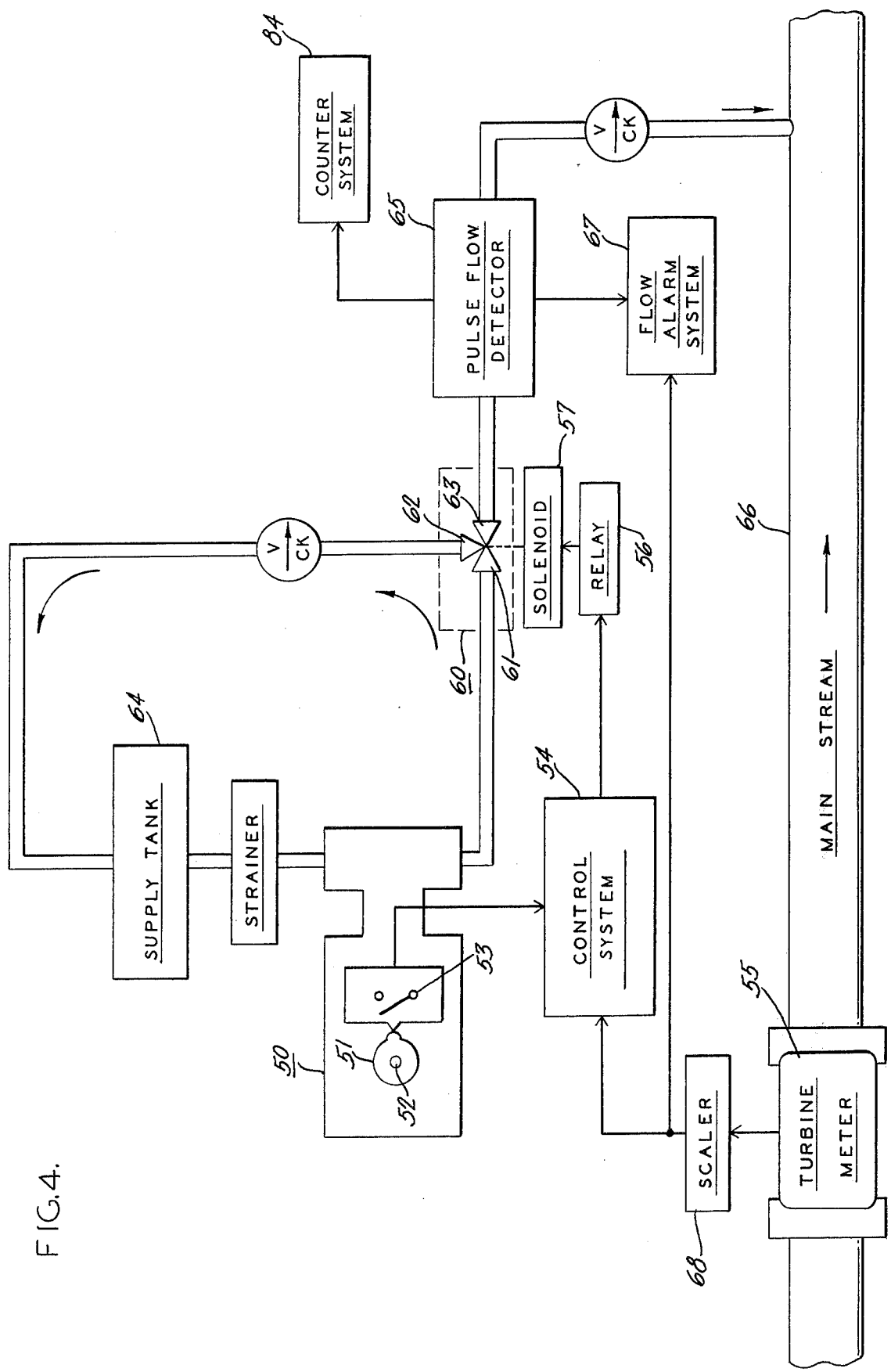
FIG. 4 is a schematic diagram of an alternate embodiment of a fluid injection system.
Figure 5:
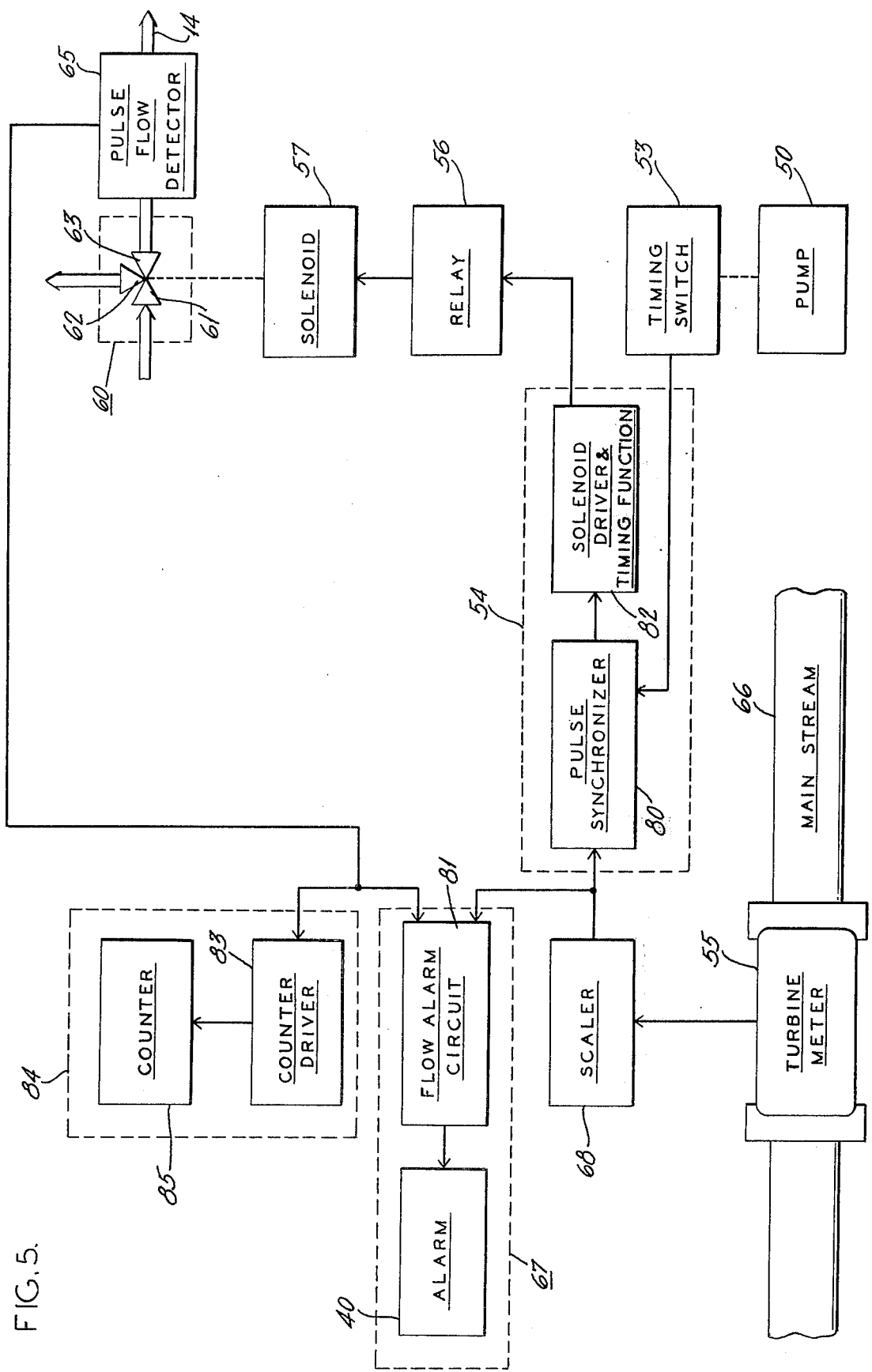
FIG. 5 is a detailed block diagram of the systems employed in the alternate embodiment.

Other embodiments are possible that operate on the same principles as the preferred embodiment. One alternate embodiment is depicted in FIGS. 4 and 5. This embodiment delays the injection of the additive until the beginning of the compression stroke of the pump. As pump 50 operates, a cam 51 mounted on a shaft 52 in pump 50 periodically actuates a timing switch 53, which is mounted on pump 50. Cam 51 and switch 53 may be replaced by other devices that perform the same function, including slotted disk, light and photocell or a magnet and magnetic switch. The switch produces a pulse that enters control system 54 at the beginning of the compression stroke and coacts with the scaled signal received from scaler 68.

Control system 54 produces a valve actuation signal in response to a signal from scaler 68 and switch 53, that actuates a relay 56 and a solenoid 57 associated with diverting valve 60. When solenoid 57 is actuated, port 62 of valve 60 is closed and port 63 is opened for a pulsed interval thereby diverting a pulse of the fluid from tank 64 through pulse flow detector 65 into main stream pipeline 66. Again, the pulse flow detector disclosed in co-pending application "PULSE FLOW DETECTOR" is particularly suitable.

Pulse flow detector 65 detects the fluid pulse and relays a signal to alarm system 67. The alarm system compares the signal from pulse flow detector 65 and the signal from turbine meter scaler 68. Should there fail to be sufficient fluid flow of either fluid, alarm system 67 actuates an alarm to warn of the situation.

A more detailed explanation of the alternate embodiment operation follows. In FIG. 5 the pulse signal from turbine meter 55 in main stream 66 enters scaler 68. The scaled signal from scaler 68 enters both a pulse synchronizer 80 and flow alarm circuit 81 of the alarm system 67.

Pulse synchronizer 80 receives the scaled signal and stores it until timing switch 53 on pump 50 produces a pulse and also sends it to the synchronizer. Synchronizer 80 may comprise a storage element, such as flip-flop, and an NAND gate. Whenever synchronizer 80 receives both pulses, it produces a signal that causes a solenoid driver 82 to actuate a relay 56 and solenoid 57 and open port 63 and close port 62 of valve 60. Timing switch 53 is set to produce a pulse only when pump 50 is about to enter the compression portion of its cycle, and synchronizer 80 will then produce a pulse to open valve 60 when pump 50 is pumping the additive fluid. Solenoid driver 82 includes a timing function that holds valve 60 open during the entire compression stroke of pump 50. The timing function may be performed for example by a counter mechanism, or an R-C circuit, or alternatively it may comprise a switching circuit in communication with switch 53 and a cam with two lobes in place of single-lobed cam 51. The stroke of pump 50, and thus the volume of injection fluid, is set in order that the volume per stroke times the stroke rate equals the desired rate of injection.

Figure 6:
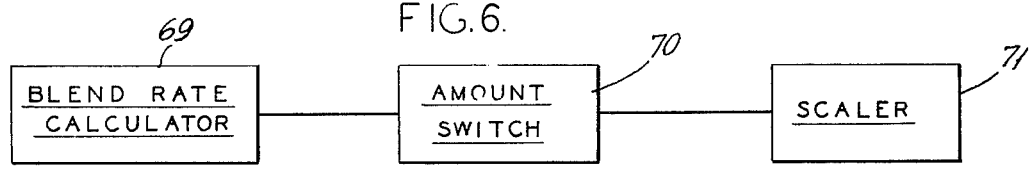
FIG. 6 is a variation of the alternate embodiment using a blend rate calculator.

Referring to FIG. 6, an alternative to using a flow meter is illustrated. A blend rate calculator 69 and an amount switch 70 replace the flow meter. Blend rate calculator 69 produces a pulse signal dependent upon a predetermined constant blend rate rather than a potentially variable flow rate as is the case when the turbine meter is used. Blend rate calculator 69 may control the injection of a fluid into several main streams. In that case each stream has an amount switch 70 to divide the pulses produced by blend rate calculator 69 and thus apportion the injection signal among the several injection systems. Each amount switch may divide the pulse signal from calculator 69 differently to provide different injection, or blend, rates in each injection system. A scaler 71 can be provided for better control of this process.

Figure 7:
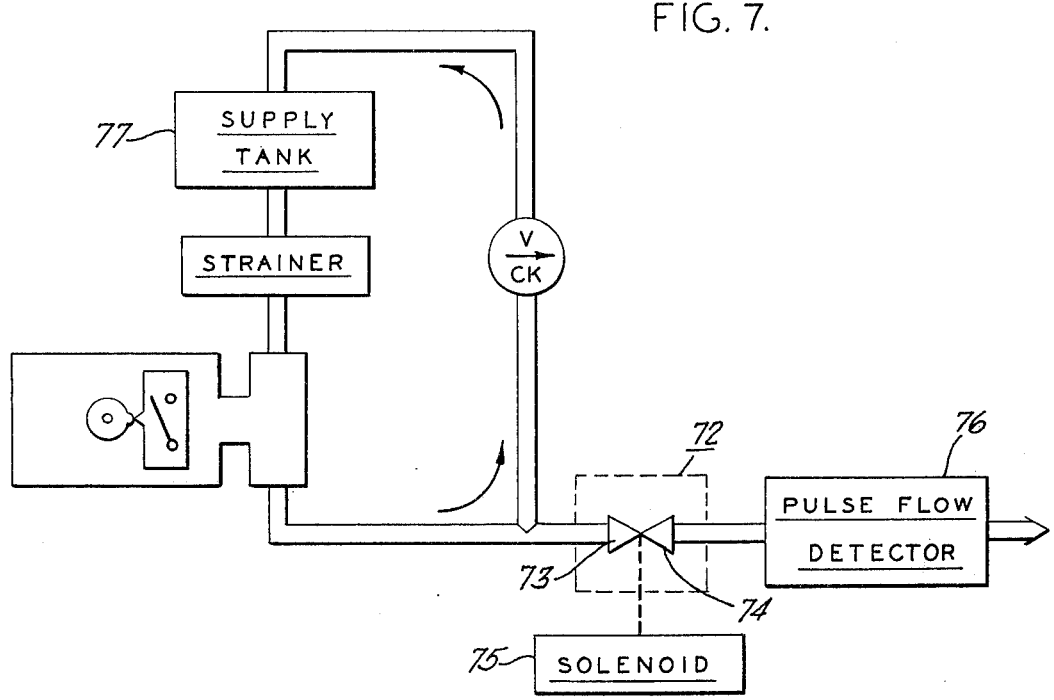
FIG. 7 is a variation of the alternate embodiment using a two-way valve.

In FIG. 7 an alternative to three-port diverting valve 60 (FIG. 4) may comprise a two-port valve 72 having a normally closed inlet port 73 and a normally closed outlet port 74 operated by solenoid 75, which controls the flow of fluid to pulse flow detector 76. The circuitous path taken by fluid in supply tank 77 does not include valve 72.

Figure 8:
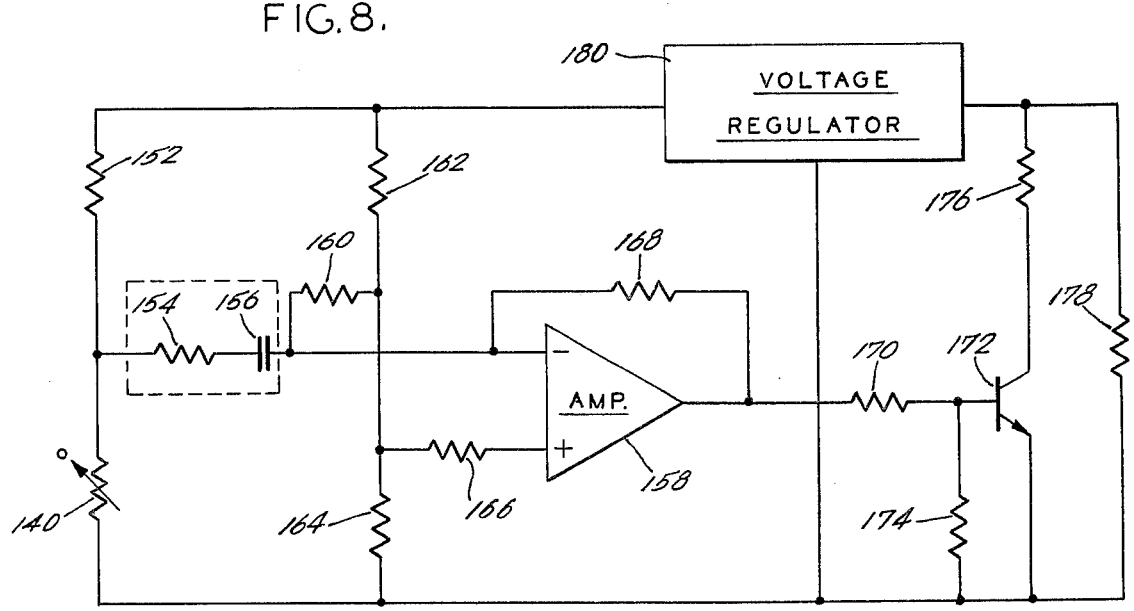
FIG. 8 is a circuit diagram of a pulse detector which can be used in the injection systems.

A brief description of the "PULSE FLOW DETECTOR" which can be used in either embodiment, follows. In FIG. 8 the pulse flow detector comprises thermistor 140 connected in series with a current limiting resistor 152. Resistor 152 may also be configured as two discrete resistors to provide standby protection for thermistor 140 should one of the two resistors fail.

Thermistor 140 is coupled to amplifier 158 through a RC filter comprising resistor 154 and a capacitor 156 and through resistors 160 and 166. The filter also serves to filter out unwanted low frequency noise. A feedback resistor 168 couples the input and output of amplifier 158. The amplification factor of the amplifier is, according to well-known principles, the ratio of resistor 168 to the sum of resistor 160 and the parallel value of resistors 162 and 164.

The output of amplifier 158 passes through a limiting resistor 170 into a transistor 172, which may be of the PNP type, that is biased by a resistor 174. A collector resistor 176 limits the current in the collector-emitter circuit of transistor 172. Transistor 172 is biased and the signal provided by amplifier 158 is sufficiently large to operate in the saturated mode. To protect the small current levels associated with the thermistor portion of the circuit from interference by the large currents in the indicator square wave portion, a voltage regulator 180 may be inserted in the circuit to isolate the two portions.

The flow detector uses thermistor 140 to detect the passage of a pulse of fluid. This pulse of fluid changes the temperature of thermistor 140, thereby changing the voltage drop across thermistor 140 and creating a square wave pulse at output resistor 178.

While both embodiments can be used effectively, the preferred embodiment has several advantages. The pumping capacity of the pump can be used more efficiently, thereby allowing the use of a smaller pump. This reduces initial costs, maintenance costs and energy costs. Also, a standard pump can be used without modification.

While particular embodiments of this invention have been shown and described, it is obvious that changes and modifications can be made without departing from the true spirit and scope of the invention. It is the intention in the appended claims to cover all such changes and modifications.

The invention claimed is:

1. System for introducing a predetermined amount of a first fluid into a main stream of a second fluid in an intermittent fashion, so that a predetermined concentration of the first fluid in the second fluid is obtained, said predetermined amount being determined without a flowmeter, said system comprising:
   a. means for providing a circuitous path through which the first fluid can be circulated;
   b. pumping means for continuously circulating the first fluid through the circuitous path at a predetermined rate;
   c. means for diverting the flow of the first fluid from said circuitous path into the main stream of the second fluid, said diverting means having a first mode wherein the first fluid is circulated only through the circuitous path and a second mode wherein the first fluid flows only from the circuitous path into the main stream;
   d. means for measuring the flow rate of the main stream of the second fluid and producing signals related to the flow rate; and
   e. means, responsive to the signals produced by the measuring means, for maintaining a predetermined concentration of the first fluid in the second fluid, by controlling the diverting means so that it is moved from its first mode to its second mode, and back to its first mode after a predetermined length of time has elapsed, thereby permitting a predetermined amount of the first fluid to be introduced into the main stream of the second fluid after a predetermined amount of the second fluid has flowed through the measuring means.

2. System recited in claim 1, further including variable means for scaling the signals produced by the measuring means so that the concentration of the first fluid in the second fluid can be varied.

3. System recited in claim 1, further including:
   a. a first back pressure valve located in the circuitous path downstream from the diverting valve; and
   b. a second back pressure valve located in conjunction with the diverting means so that the first fluid diverted from the circuitous path to the main stream of the second fluid, flows through the second back pressure valve before entering the main stream.

4. System recited in claim 1, wherein the diverting means is a three-way diverting valve.

5. System recited in claim 1, wherein the maintaining means comprises:
   a. actuation means for the diverter means having a normal position in which the diverter means is held in its first mode and an actuated position in which the diverter means is held in its second mode;
   b. means for switching the diverter valve actuation means into its actuated position in response to a signal from the measuring means;
   c. means, responsive to the diverter valve actuation means being switched into its actuated position, for producing a timing output signal at a predetermined time interval after the valve actuation means is switched into its actuated position; and
   d. means for switching the actuation means back to its normal position in response to the timing output signal.

6. System recited in claim 5, wherein the means for producing a timing output signal includes a divider/timing circuit.

7. System recited in claim 5, wherein the pumping means includes means for pumping the first fluid in pulsed portions and the predetermined time interval of the means for producing a timing output signal is set at a time interval equal to a multiple of the period of the pumping means.

8. System recited in claim 1, wherein said circulating means comprises means for pumping the first fluid in pulsed portions.

9. System recited in claim 8, wherein said pumping means comprises a reciprocating pump having a diaphragm head.

10. System recited in claim 8, further including means for detecting said pulsed portions of the first fluid flowing into the main stream.

11. System recited in claim 8, wherein the controlling means comprises:
    a. activation means for the diverter means having a normal position in which the diverter means is held in its first mode and an actuated position in which the diverter means is held in its second mode;
    b. means for generating a control pulse in response to the pumping means operation;
    c. means for switching the diverter valve actuation means into its actuated position only when a control pulse from the control pulse generating means has been received after a signal from the measuring means of the main stream has been received; and
    d. means for maintaining the actuation means in its actuated position for a predetermined time interval after it is actuated.

12. System recited in claim 11, wherein the predetermined time interval of the maintaining means for the actuation means is set at a time interval equal to a multiple of the period of the pumping means and the control pulse generating means is designed to generate a control pulse at the beginning of each compression stroke of the pump.

* * * * *